United States Patent [19]

Ishida et al.

[11] Patent Number: 4,569,433

[45] Date of Patent: Feb. 11, 1986

[54] ESCALATOR SYSTEM WITH A DROP-DOWN STEP

[75] Inventors: Matsuhiko Ishida, Inazawa; Shosaku Inoue, Misato, both of Japan

[73] Assignee: Mitsubishi Denki Kabushiki Kaisha, Tokyo, Japan

[21] Appl. No.: 644,279

[22] Filed: Aug. 27, 1984

[30] Foreign Application Priority Data

Aug. 30, 1983 [JP] Japan ............................... 58-158205

[51] Int. Cl.[4] ............................................ B65G 9/12

[52] U.S. Cl. .................................... 198/333; 198/326

[58] Field of Search ............................... 198/333, 326

[56] References Cited

U.S. PATENT DOCUMENTS 4,326,622 4/1982 Ellzey ............................ 198/333 X

FOREIGN PATENT DOCUMENTS 52-61091 5/1977 Japan .................................. 198/333

*Primary Examiner*—Joseph E. Valenza

*Assistant Examiner*—Michael Stone

*Attorney, Agent, or Firm*—Leydig, Voit & Mayer Ltd.

[57] ABSTRACT

An escalator system comprises an endless loop of chain links extending between two landings, a plurality of steps pivotally connected to the chain link loop, a guide rail system for guiding the steps, and a drive means for driving the chain link along the chain link loop with the steps thereon. At least one of the escalator steps comprises a step main body pivotally connected to a chain link loop and guided by a guide rail system, and a drop-down portion pivotally mounted to the main body and movable between a horizontal position in which the main body and the drop-down portion together forms a usual step tread and a drop-down position in which the drop-down portion is dropped down for allowing a wheel chair to be carried on the steps.

3 Claims, 13 Drawing Figures

ESCALATOR SYSTEM WITH A DROP-DOWN STEP

FIELD OF THE INVENTION

This invention relates to escalator systems and more particularly to escalator systems in which at least one of the steps includes a drop-down tread portion for allowing a wheel chair to be safely carried on the escalator.

DESCRIPTION OF THE PRIOR ART

One example of an escalator system in which a wheel chair or a baby buggy can be carried on a step tread portion is disclosed in Japanese Patent Publication No. 56-41555 in which a special step for carrying a wheel chair thereon having a tread deeper than other ordinary steps is installed in combination with ordinary steps in the endless belt. The depth of the tread of this step is determined by the dimension of the wheel chair or the baby buggy to be carried on the tread. With this arrangement, however, the deeper step for a wheel chair requires a larger radius for turning-around which makes the main frame of the escalator system deep and large, imposing a severe restriction in installation of the system.

SUMMARY OF THE INVENTION

Accordingly, an object of the present invention is to provide an escalator system with a step for carrying a wheel chair or the like and still compact in its dimension.

Another object of the present invention is to provide an escalator system wherein one of steps, which can usually be used as an ordinary step, is convertible into the one for carrying a wheel chair or the like only when necessary.

With the above objects in view, the present invention resides in an escalator system comprising an endless loop of chain links extending between two landings to form two turn-around portions and a load bearing run therebetween, a plurality of steps pivotally connected to the chain link loop, each of the steps having a tread porton and a guide roller, a guide rail system for guiding the guide roller of the steps to maintain the tread portion of the steps in a horizontal position while the steps are in the load bearing run, and a drive means for driving the chain link along the chain link loop with the steps thereon.

At least one of the steps comprises a step main body connected to the chain link loop and guided by the guide rail system, and a drop-down portion mounted to the main body and movable between a first and a second position. The step main body has formed thereon a main body tread portion, and the drop-down portion has formed thereon a drop-down tread portion. The first position is a horizontal position in which the drop-down tread portion forms, in cooperation with the main body tread portion of the step main body, a horizontal step tread portion for supporting the load thereon, and the second position is a drop-down position in which the drop-down portion is dropped-down from its first horizontal position until its riser portion is substantially located below the tread portion of the adjacent step. The drop-down portion has a retractable guide wheel which is selectively engageable with a guide track for moving the drop-down portion between the first and the second positions when engaged with the guide track.

When it becomes necessary to carry a wheel chair, the retractable wheel mounted on the drop-down portion of the step is engaged with the guide track for moving the drop-down portion of the step. As the step loop travels, the retractable wheel is guided by the guide track to cause the drop-down portion of the step to be dropped-down until the substantial portion of the riser of the drop-down portion is positioned below the tread of the adjacent step. Thus, only a small step or a very low riser is provided betwen the dropped-down step and the adjacent step, providing an enough space for accommodating a wheel chair or the like on these two neighboring steps.

BRIEF DESCRIPTION OF THE DRAWINGS

The invention will now be described in more detail along the preferred embodiments thereof taken in conjunction with the accompanying drawings, in which.

DESCRIPTION OF THE PREFERRED EMBODIMENTS

Figure 1:
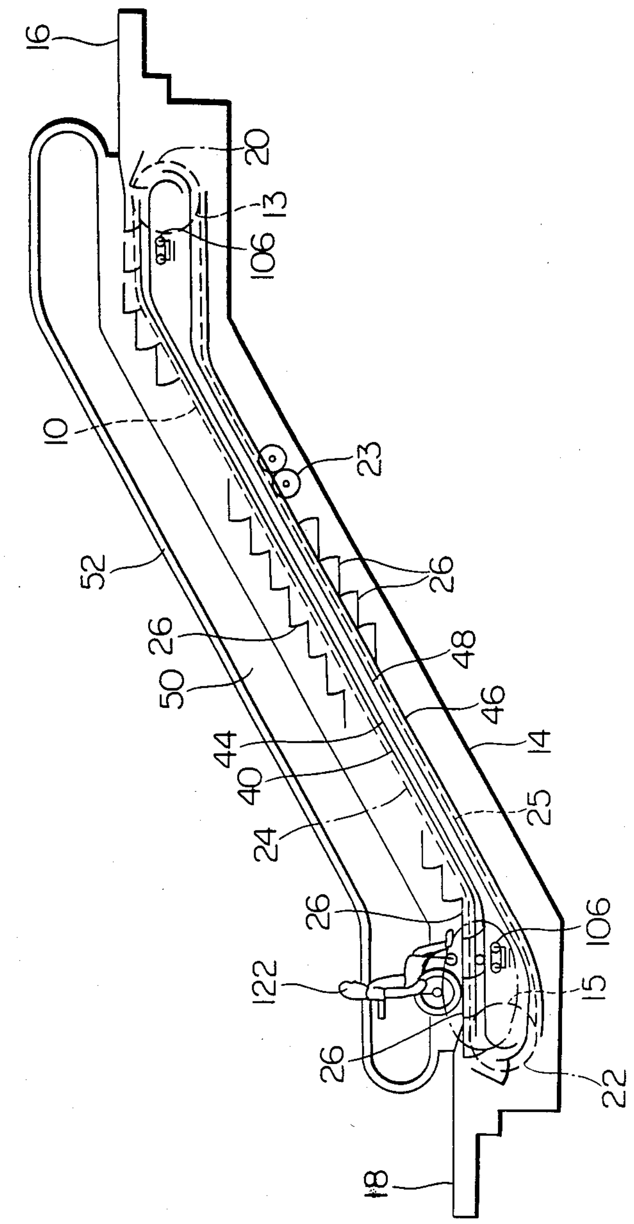
FIG. 1 is a schematic view of an escalator system constructed in accordance with the present invention.
Figure 2:
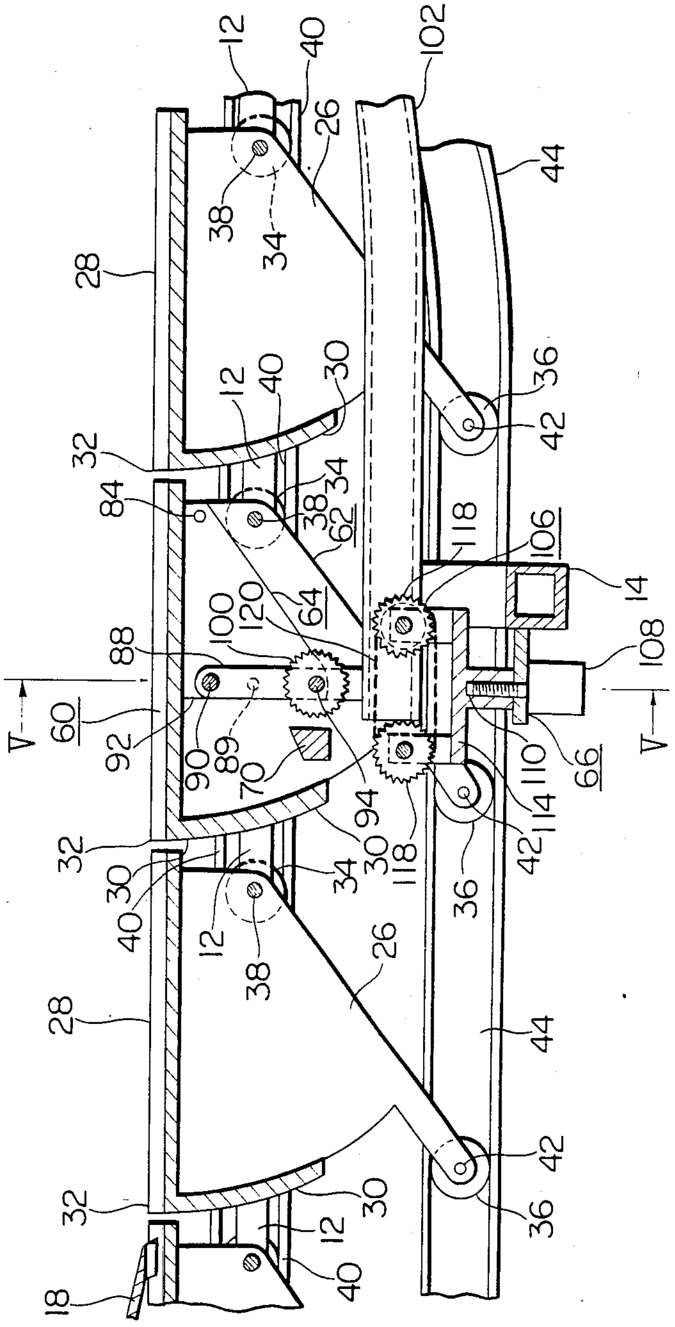
FIG. 2 is an enlarged sectional view of the portion encircled by a dot-and-dash line in FIG. 1.

In FIGS. 1 to 11 in which one embodiment of the escalator system of the present invention is illustrated, it is seen that the escalator system comprises an endless loop 10 of a plurality of chain links 12 supported by a main frame 14. The loop 10 of the chain links 12 is supported in the main frame 14 by chain sprockets 13 and 15 mounted below the upper and the lower landings 16 and 18 to form an upper and a lower turn-around portions 20 and 22. A suitable known drive means 23 is provided on the main frame 14 to drive the chain links 12 along an endless loop path 10 including the turn-around portions 20 and 22 and a load bearing run 24 and a return run 25 extending between the upper and the lower turn-around portions 20 and 22. Each of the chain links 12 has connected thereto a step 26 having a horizontal tread 28 on which a passenger stands, a substantially vertical riser 30 and a front edge 32 of the step between the intersecting corner of the tread 28 and the riser 30. Each step 26 also has mounted thereon leading guide wheels 34 and trailing guide wheels 36. The leading wheels 34 are rotatably supported on a shaft 38 extending through the step 26 and the chain link 12, and are guided by a first guide rail 40. The trailing wheels 36 are rotatably supported by a shaft 42 mounted on the step 26 and are supported by second guide rail 44. The guider rails 40 and 44 disposed for supporting the upper half, i.e. the load bearing run of the loop 10, as well as the guide rails 46 and 48 for the lower half of the loop 10, i.e., the return run constitute a guide rail system for causing the steps 26 to be kept in a position in which their tread 28 is substantially horizontal while the steps are on the load-bearing run 24 as is well known in the art. Balustrades 50 for supporting thereon handrails 52 are provided along the load-bearing run of the step loop 10.

According to the present invention, at least one of the steps of the escalator system is a drop-down step 60. The drop-down step 60 is the same step as the steps 26 in the sense that they are the same in dimensions and in the usual operation. However, the drop-down step 60 is special in the sense that it comprises a step main body 62, a movable drop-down portion 64 and a drop-down mechanism 66.

Figure 3:
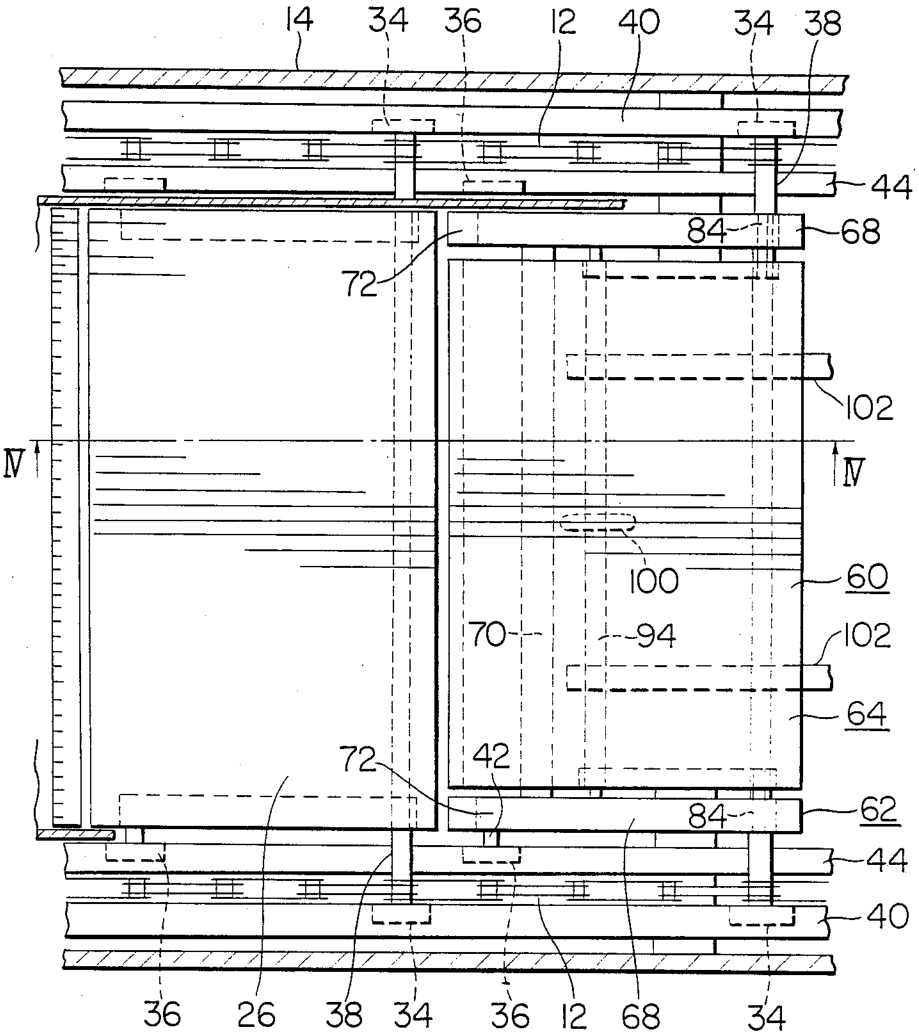
FIG. 3 is a plan view of the portion shown in FIG. 2.
Figure 4:
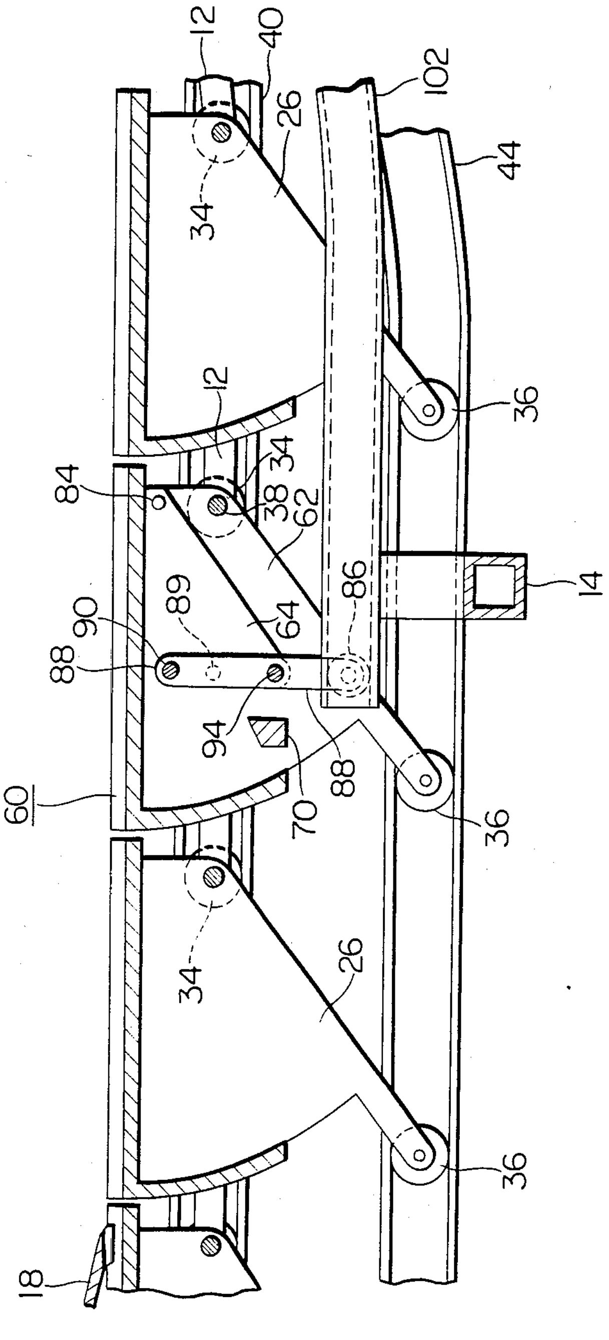
FIG. 4 is a sectional view taken along the line IV—IV of FIG. 3.
Figure 5:
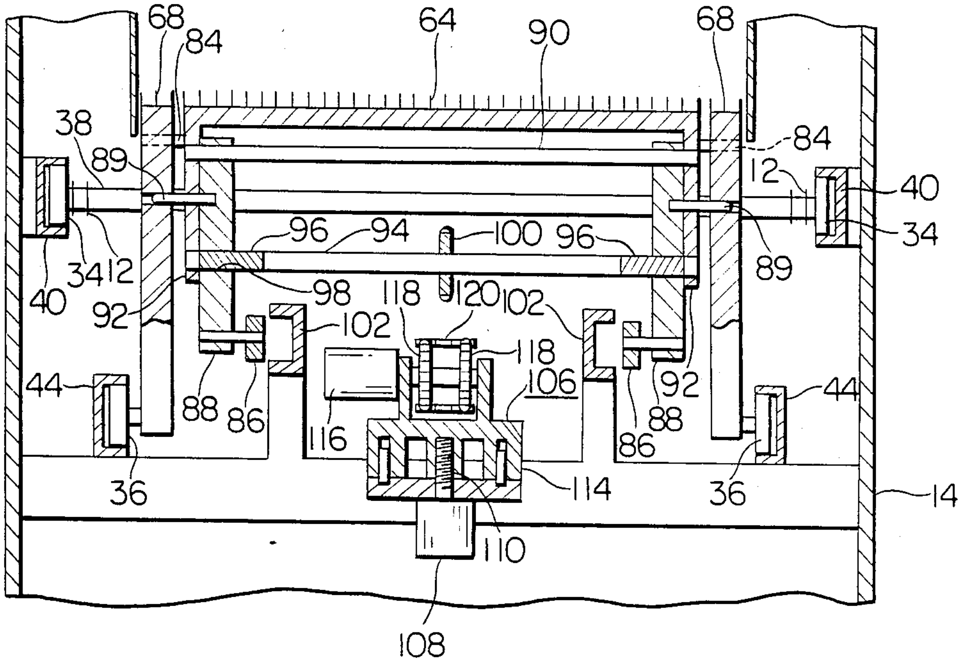
FIG. 5 is a sectional view taken along the line V—V of FIG. 2.
Figure 9:
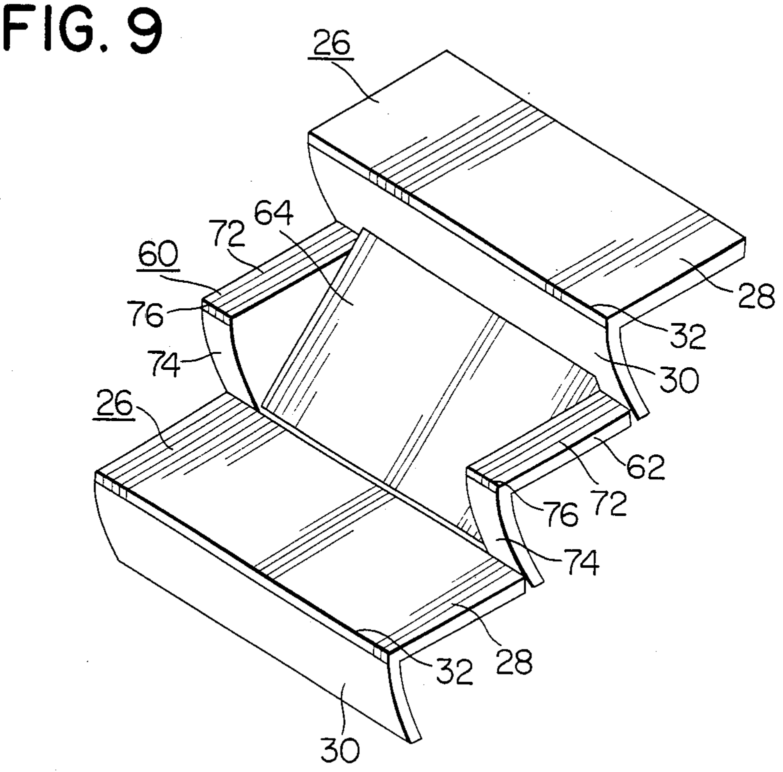
FIG. 9 is a schematic perspective view of the steps with its drop-down portion lowered in the drop-down position.

The step main body 62 comprises two parallel plate-like side sections 68 as is best seen in FIGS. 3 and 5 and pivotally connected to the chain link 12 by the shaft 38 and supported by the rollers 34 and 36 guided by the guide rails 40 and 44, respectively. The two side sections 68 are connected to and kept parallel to one another by the shafts 38 and a connecting bar 70 rigidly secured at the opposite ends to the side sections 68 so that a relatively large space is defined between two side sections 68. As best seen in FIG. 9, each of the side sections 68 has a tread 72, a riser 74 and a front edge 76 between the tread 72 and the riser 74.

The drop-down step 60 also comprises a movable or a drop-down portion 64 between the two parallel side sections 68 of the step main body 62. The drop-down portion 64 has a tread 78 which can be flush with the tread 72 of each of the side sections 68 of the step main body 62, a riser 80 which can also be flush with the riser 74 of the step main body 62, and a front edge 82 defined between the tread 78 and the riser 80. The drop-down portion 64 is pivotally supported by pins 84 disposed above the shaft 38 at the side sections 68 of the step main body 62. The drop-down portion 64 comprises a pair of retractable wheels 86 (see FIG. 5) rotatably supported at the lower end of a pair of arms 88 pivotally and slidably supported at the upper end on a shaft 90 on side walls 92 of the drop-down portion 64. The arms 88 also has fixedly mounted thereon between the shafts 90 and 94 locking pins 89. The locking pins 89 are usually inserted within holes formed in the side sections 68 and pulled out from the holes of the side sections 68 when the slidable arms 88 are moved toward each other. A screw rod 94 is rotatably but not axially slidably supported on the side walls 92 and its threaded portions 96 thread engage with threaded holes 98 formed in the arm levers 92. The screw rod 94 has securely mounted on its central portion a chain sprocket 100.

The escalator system of the present invention further comprises a pair of guide tracks 102 rigidly supported from the frame structure 14. The guide tracks 102 are located in the vicinity of the guide wheels 86 in such a positional relationship that the guide wheels 86 can be received and guided by the guide tracks 102 when the wheels 86 are advanced in a advanced position (FIG. 7) from a receded position (FIG. 5).

In order to move the guide wheels 86 between their receded and advanced positions, the escalator of the present invention comprises an operating mechanism 106. The operating mechanism 106 comprises a first electric motor 108 fixed on the frame structure 14 and has its threaded output shaft 110 thread engaged within a threaded hole of a frame work 114 which mounts a second electric motor 116 and two pairs of chain sprockets 118 having a wide belt chain 120 wound therearound. The frame work 114 of the operating mechanism 106 is supported from the frame structure 14 so as to be able to move toward and away from the chain sprocket 100 mounted on the treaded rod 94, i.e., in the direction of the axis of the first motor 108 which prevented from turning about the threaded output shaft 110 of the first motor 108.

In a usual operation, the drop-down step 60 is used and operated just like an ordinary escalator step with its drop-down portion 64 fixed to the step main body 62 by the locking pins 89. In this position, as seen from FIGS. 2 to 5, the retractable wheel 86 on the arms 88 of the drop-down portion 64 are disengaged from the guide tracks 102, and the chain sprocket 100 on the threaded rod 94 is also disengaged from the chain belt 120 of the operating mechanism 106.

Figure 6:
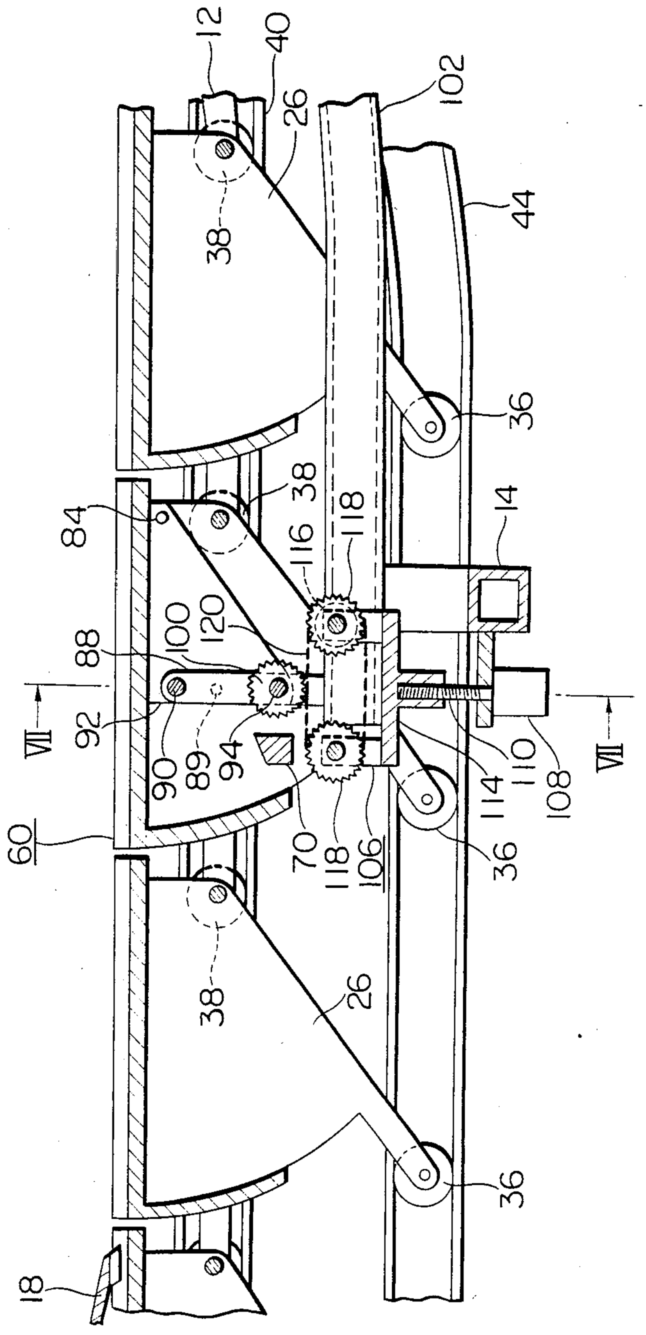
FIG. 6 is a sectional view similar to FIG. 2 but illustrating the operation of the drop-down mechanism.
Figure 7:
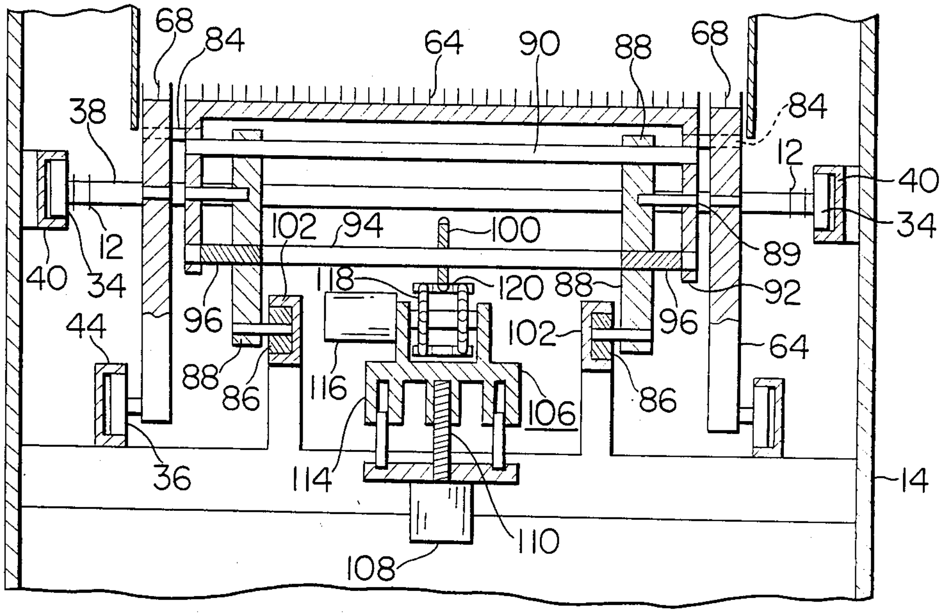
FIG. 7 is a sectional view taken along the line VII—VII of FIG. 6.

When it is necessary to carry a person on a wheel chain 122 from the lower landing 18 to the upper landing 16 by the escalator system of the present invention, the escalator system being operated as an ordinary escalator with regular steps is stopped by a stop button (not shown) disposed on a balustrade panel, for example, when the chain sprocket 100 of the drop-down step 60 is positioned just above the chain belt 120 of the operating mechanism 106. Then, the first electric motor 108 of the operating mechanism 106 is energized to move the chain belt 120 wound around the sprockets 118 from the position shown in FIGS. 2 and 5 toward the sprocket 100 on the thread rod 94 until the chain belt 120 engages the sprocket 100 as shown in FIG. 6. At this position, the second motor 116 of the operating mechanism 106 is energized to drive the chain belt 120 and rotate the chain sprocket 100 fixed on the threaded rod 94. The rotation of the threaded rod 94 in one direction causes the arms 88 thread engaged with the rod 94 to be moved toward each other along the rod 94 and the shaft 90, and the locking pins 89 are pulled out from the holes of the side sections 68 of the step main body 62 and the guide wheels 86 on the slidable arms 88 are received within the channel-shaped guide tracks 102. This position is best seen in FIG. 7. Then, the first motor 108 of the operating mechanism 106 is driven in the opposite direction to move the chain belt 120 away from the chain sprocket 100 on the threaded rod 94.

It is to be noted that in this position the step main body 62 is supported and guided by the guide rails 40 and 44 through the rollers 36 and 38, while the drop-down portion 64 is supported and guided by the pins 84 which are mounted on the leading edge of the side sections 88 and the guide tracks 102 through the guide wheels 86. In other words, the step main body 62 and the drop-down portion 64 are independently supported and guided from each other by the separate guide rails.

Figure 8:
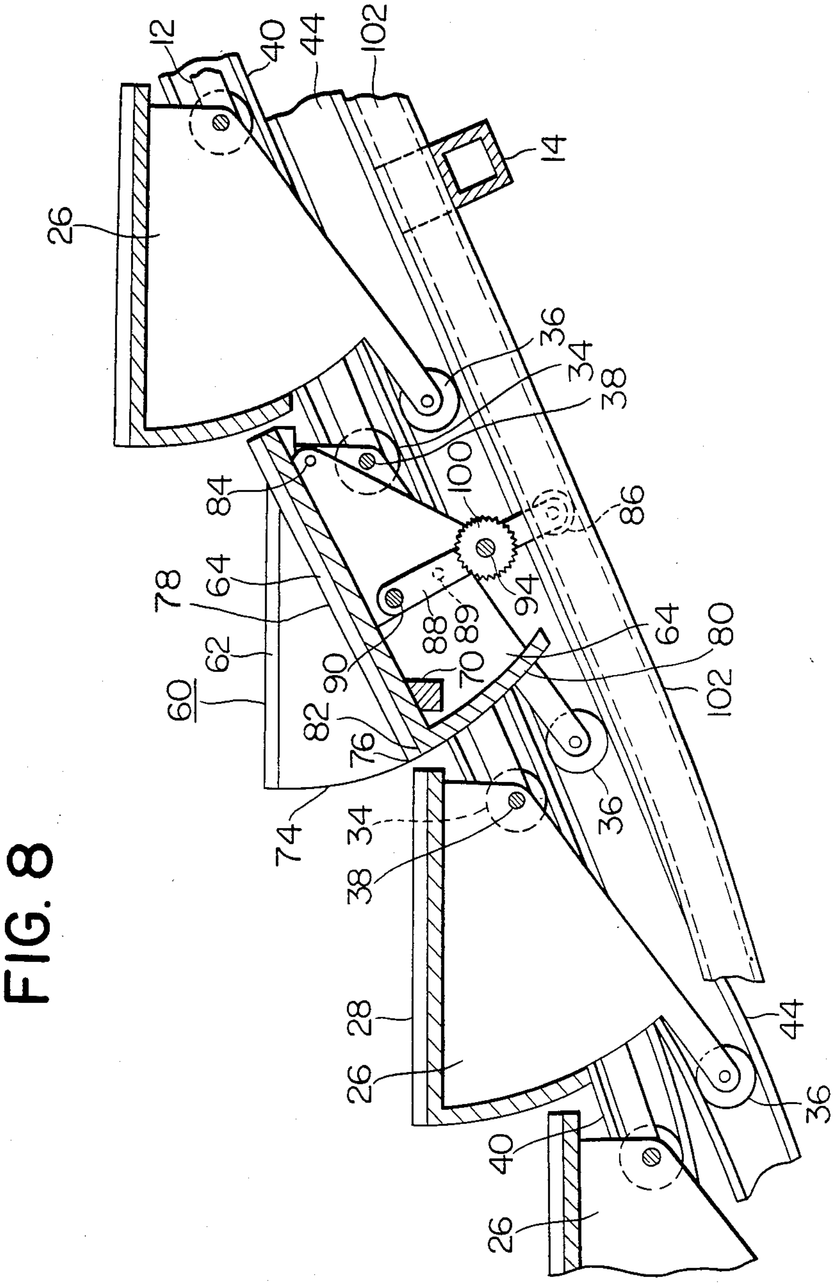
FIG. 8 is a schematic view of the steps with its drop-down portion lowered in the drop-down position.

As previously described, the guide rail system including the guide rails 40, 44, 46 and 48 supports and guides the steps 26 as is well known in the art. However, the guide tracks 102 for supporting and guiding the drop-down portion 64 through the retractable wheels 86 are arranged in such a manner that the guide tracks 102 maintain the tread 78 of the drop-down portion 64 horizontal while the drop-down step 60 is in the horizontal portion of the loop path 10 near the landings 16 and 18, and that the guide tracks 102 keep the drop-down portion 64 of the drop-down step 60 dropped-down or slanted as shown in FIGS. 8 and 9 while the drop-down step 60 is in the sloped portion of the loop path 10 between the upper and the lower horizontal portions. It is seen from FIGS. 8 and 9, that the riser 80 of the drop-down portion 64 is completely below and hidden behind the tread of the adjacent ordinary step 26 and the front edge 82 defined between the tread 78 and the riser 80 is at substantially the same level as the tread 28 of the adjacent step 26.

Figure 10:
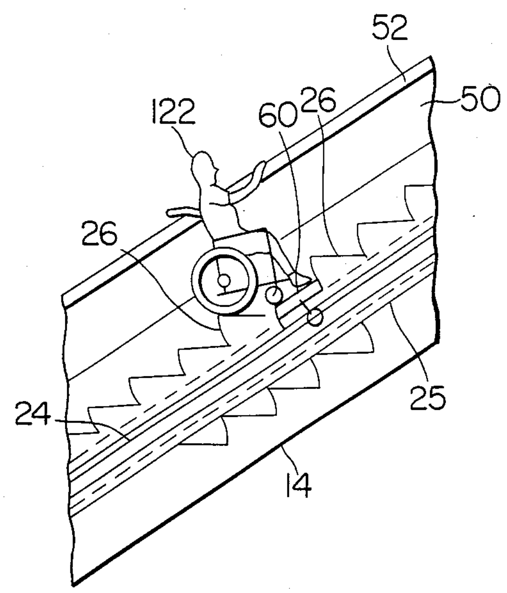
FIGS. 10 and 11 are views illustrating the manners in which a person on a wheel-chair is ascending and descending, respectively, by the escalator system of the present invention.
Figure 11:
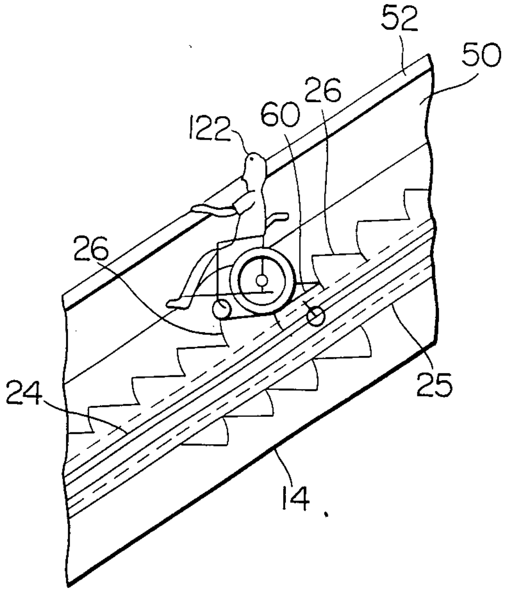

Therefore, the passenger on the wheel chair 122 can be safely ride on the escalator steps using two steps, i.e., the slanted drop-down step 60 and the horizontal ordinary step 26 immediately under the drop-down step 60 as shown in FIGS. 10 and 11, which show the escalator system ascending and descending, respectively.

As the dropped-down drop-down step 60 reaches the upper landing 16, the drop-down portion 64 gradually pivot about the pin 84 relative to the step main body 62 to change the slope of its thread 78 to be horizontal in the transient region between the sloped portion and the horizontal portion of the loop path 10. When the chain sprocket 100 of the drop-down portion 64 comes immediately above a chain belt of the upper operating mechanism 106, the escalator system is stopped and the similar operation as previously explained in connection with the lower horizontal loop portion is repeated to retract and disengage the guide wheels 86 of the drop-down portion 64 from the guide tracks 102, to insert the locking pin 89 into the holes formed in the side sections 68 of the step main body 62 and to disengage the operating mechanism 106 from the chain sprocket 100, thereby again establishing the condition shown in FIG. 5. In this condition, the drop-down portion 64 is not movable relative to the step main body 62 which moves in the similar manner to the other ordinary steps 26 in the loop 10, so that the drop-down step 60 functions quite similarly to the ordinary steps 26.

Figure 12:
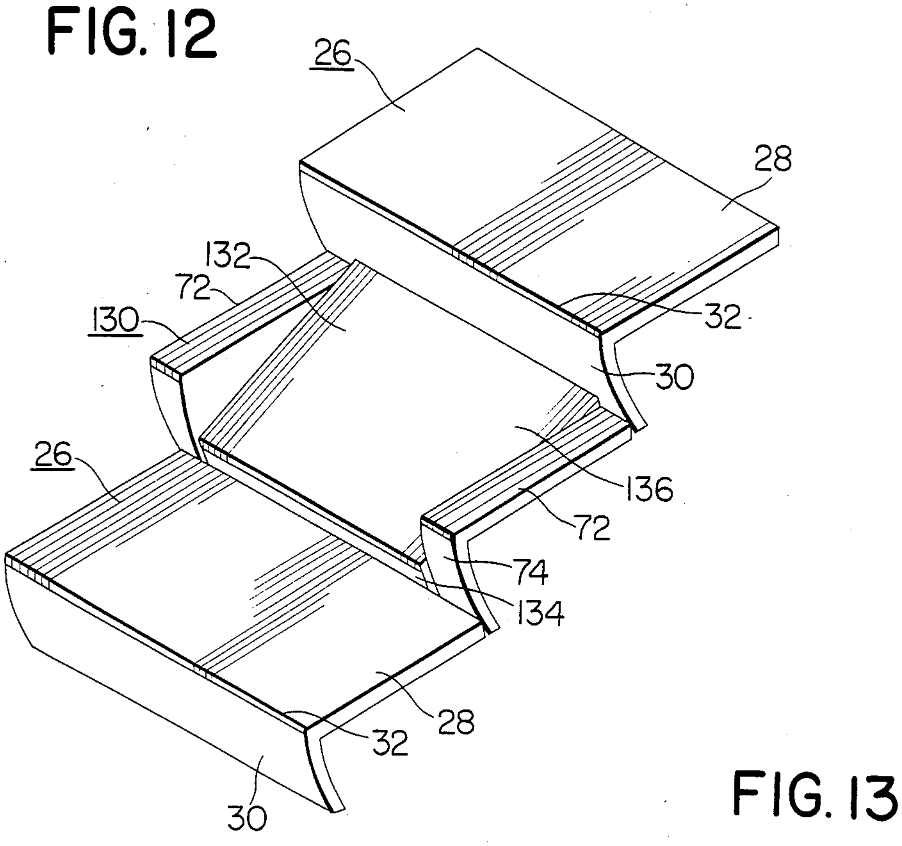
FIGS. 12 and 13 are perspective views similar to FIG. 9 but illustrating the modified arrangements of the steps with its drop-down portion in the drop-down position.
Figure 13:
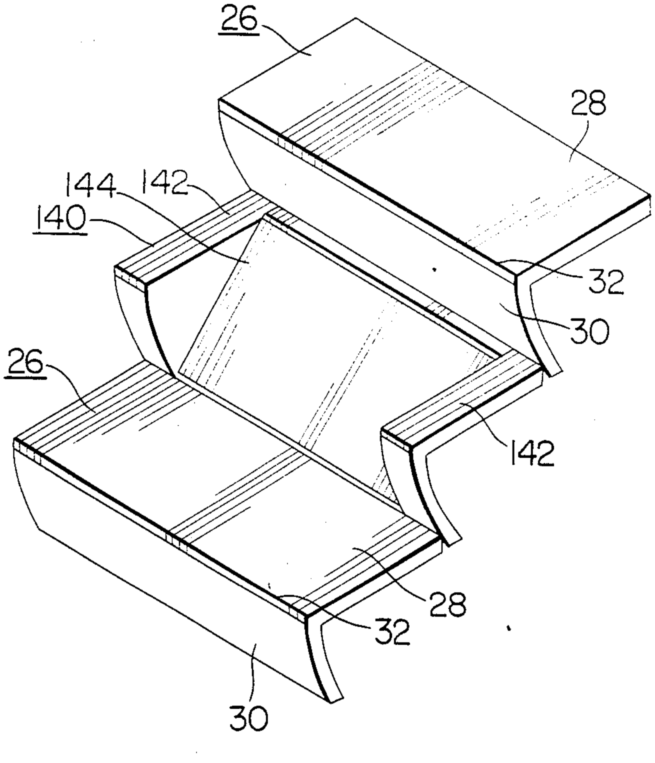

FIGS. 12 and 13 illustrate modified embodiments of the present invention. A drop-down step 130 of the modified embodiment shown in FIG. 12 has a drop-down portion 132 which is not completely dropped-down but a top portion of a riser 134 slightly remains above the tread 28 of the adjacent ordinary step 26. Therefore, a tread 136 of the drop-down portion 132 is less steeper than the tread of the drop-down portion 64 of the previously described first embodiment. This arrangement can be made by simply shifting the position of the cross bar 70 to a slightly upper position than the position of the cross bar 70 shown in FIGS. 2, 3, 4, 6 and 8, and slightly shifting the guide tracks 102 for guiding the guide wheels 86 of the drop-down portion 132. The height of the riser 134 above the tread 28 of the adjacent step 26 may be as high as 5 cm.

Another drop-down step 140 shown in FIG. 13 has a step main body 142 of generally U-shape in plan view and a drop-down portion 144 smaller than the drop-down portions 64 and 132 of the previous embodiments. This modification may be achieved by simply shifting the position of a pivot pin for connecting the drop-down portion 144 to the step main body 142.

What is claimed is:

1. An escalator system comprising;

an endless loop of the chain links extending between two landings having horizontal loop path portions to form two turn-around portions and a load bearing run therebetween;

a plurality of steps pivotally connected to said chain link loop, each of said steps having a tread portion and a guide roller;

guide rail means for guiding said guide roller of said steps to maintain the tread portion of said steps in a horizontal position while said steps are in the load bearing run; and drive means for driving said chain link along said chain link loop with said steps thereon;

at least one of said steps comprising a step main body connected to said chain link loop and guided by said guide rail means, said step main body having formed thereon a main body tread portion, and a drop-down portion mounted to said main body and movable between a first and a second position, said drop-down portion having formed thereon a drop-down tread portion and a riser portion, said first position being a position in which said drop-down tread portion forms, in cooperation with said main body tread portion of said step main body, a step tread portion for supporting the load thereon, and said second position being a position in which said drop-down portion is dropped-down from its first position until its riser portion is substantially located below the tread portion of the adjacent step;

said drop-down portion having a retractable guide wheel selectively engageable with a guide track for moving said drop-down portion between said first and said second positions when engaged with said guide track.

2. An escalator system as claimed in claim 1, wherein said drop-down portion is pivotally connected to said step main body, said retractable guide wheel is rotatably mounted on a slide arm member which slides between a first position in which said slide arm member fixes said drop-down portion to said step main body and a second position in which said slide arm member allows pivotal movement of said drop-down portion relative to said step main body, said retractable guide wheel engages said guide track when said slide arm member is in said second position, and said guide track maintains said drop-down portion in a substantially horizontal position in the horizontal loop path portion and in a slanted position in the load bearing run.

3. An escalator system as claimed in claim 2, wherein said slide arm member is thread engaged with a threaded rod having a chain sprocket fixedly mounted thereon, and further comprising a retractable operating mechanism for selectively rotating said threaded rod to slide said slide arm member between said first and second positions.

* * * * *